(12) United States Patent
Kamada (10) Patent No.: US 8,743,912 B2
(45) Date of Patent: Jun. 3, 2014

(54) TRANSMISSION SYSTEM, TRANSMITTING DEVICE, RECEIVING DEVICE, TRANSMISSION METHOD, AND COMPUTER PROGRAM

(75) Inventor: Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 13/516,435

(22) PCT Filed: Sep. 27, 2010

(86) PCT No.: PCT/JP2010/066673
§ 371 (c)(1),
(2), (4) Date: Jun. 15, 2012

(87) PCT Pub. No.: WO2011/074305
PCT Pub. Date: Jun. 23, 2011

(65) Prior Publication Data
US 2012/0263193 A1  Oct. 18, 2012

(30) Foreign Application Priority Data
Dec. 18, 2009 (JP) ................................. 2009-287806

(51) Int. Cl.
*H04J 3/06* (2006.01)
(52) U.S. Cl.
USPC .......................................................... 370/503
(58) Field of Classification Search
CPC .......................................................... H04J 3/07
See application file for complete search history.

(56) References Cited

U.S. PATENT DOCUMENTS

| 5,504,752 | A | * | 4/1996 | Okazaki et al. | 370/505 |
| 6,285,654 | B1 | * | 9/2001 | Marchok et al. | 370/208 |
| 6,674,771 | B1 | * | 1/2004 | Taniguchi | 370/505 |
| 7,002,968 | B1 | * | 2/2006 | Tomizawa et al. | 370/395.52 |
| 7,898,935 | B2 | * | 3/2011 | Marchok et al. | 370/210 |
| 7,916,756 | B2 | * | 3/2011 | Atsumi et al. | 370/503 |
| 2002/0034160 | A1 | * | 3/2002 | Marchok et al. | 370/208 |

FOREIGN PATENT DOCUMENTS

| JP | 2001-168822 | 6/2001 |
| JP | 2001-359059 | 12/2001 |
| JP | 2002-271287 | 9/2002 |
| JP | 2003-069634 | 3/2003 |

OTHER PUBLICATIONS

International Search Report—PCT/JP2010/066673—Dec. 28, 2010.
(Continued)

*Primary Examiner* — Clemence Han
(74) *Attorney, Agent, or Firm* — Young & Thompson (57) ABSTRACT

Disclosed is a transmission system, having a transmitting device and a receiving device, which divides a series of data streams into a plurality of unit data and transmitting the unit data. The transmitting device and receiving devices include synchronization units outputting mutually synchronized clock signals. A frequency change unit changes a frequency of a time division multiplexing (TDM) signal on the basis of the clock signal output from the synchronization unit of its own device. A conversion unit converts the TDM signal with the changed frequency into the unit data and transmitting the unit data to the receiving device. A decoding unit receives the unit data from the transmitting device and generates the TDM signal with the changed frequency. A frequency restoration unit restores the TDM signal by returning a frequency of the TDM signal with the changed frequency to an original on the basis of the clock signal.

6 Claims, 7 Drawing Sheets

(56) References Cited

OTHER PUBLICATIONS

International Telecommunications Union—Telecommunication Standardization Sector (ITU-T) G.8261/Y.1361—Series G: Transmission Systems and Media Systems and Networks; Packet over Transport aspects; Quality and availability targets; Series Y: Global Information Infrastructure, Internet Protocol Aspects and Next Generation Networks—internet protocol aspects—Transport; Timing and synchronization aspects in packet networks.

Institute of Electrical and Electronics Engineers (IEEE), IEEE Standard for a Precision Clock Synchronization Protocol for Networked Measurement and Control Systems, 1588v2, Jul. 24, 2008.

* cited by examiner

TRANSMISSION SYSTEM, TRANSMITTING DEVICE, RECEIVING DEVICE, TRANSMISSION METHOD, AND COMPUTER PROGRAM

TECHNICAL FIELD

The present invention relates to technology for transmitting time division multiplexing (TDM) signals via a network.

BACKGROUND ART

Technology for transmitting a TDM signal via a network has been proposed (for example, see Patent Document 1). Examples of the above-described technology in the related art are structure-agnostic time division multiplexing over packet (SAToP) of Request for Comments (RFC) 4553, circuit emulation service over packet switched network (CESoPSN) of RFC 508, Metro Ethernet Forum 8 (MEF8), and the like. In these technologies, it is necessary to use a packet itself to restore a frequency component of a TDM signal because a packet network is asynchronous. Specifically, the restoration of the frequency component of the TDM signal is implemented by a method of inserting time information into a packet, a method of setting a packet transmission interval by a TDM frequency, or the like.

Figure 7:
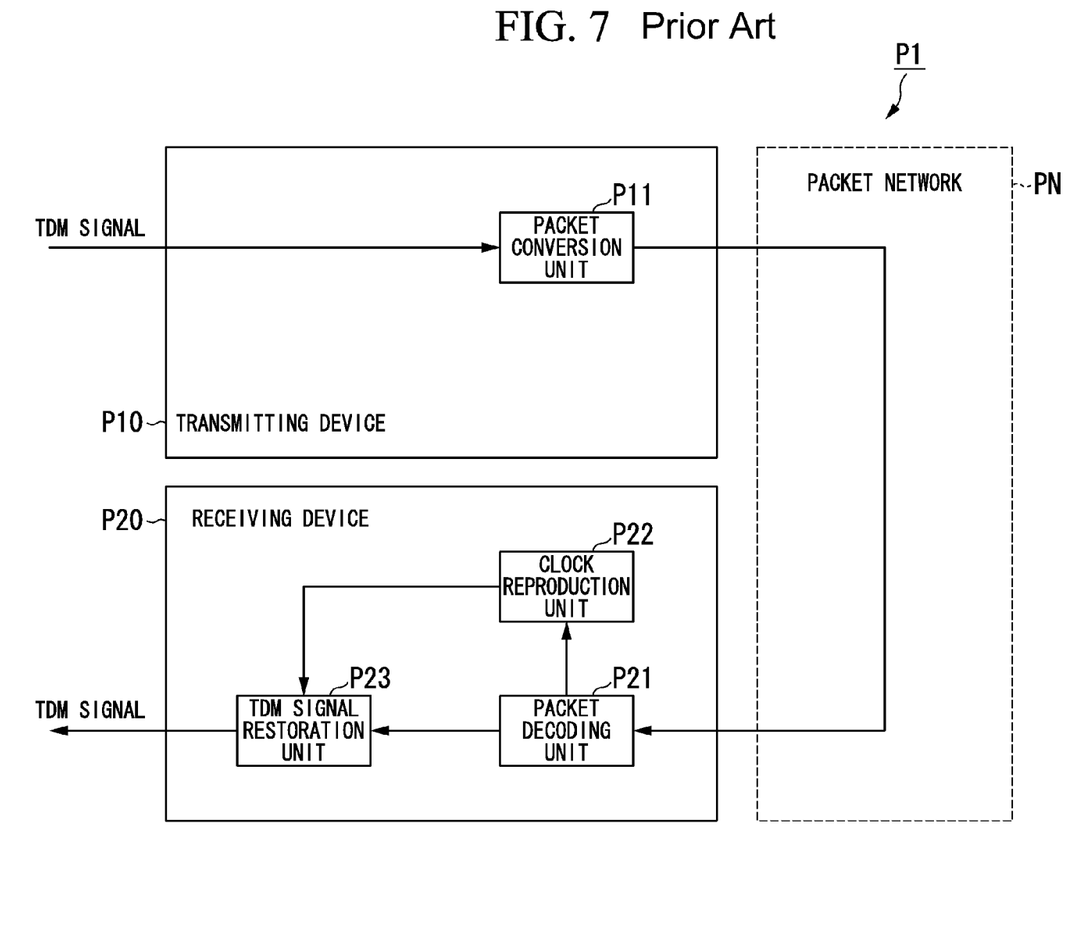
FIG. 7 illustrates an example of a system for transmitting a TDM signal via a packet network.

FIG. 7 illustrates an example of a system for transmitting a TDM signal via a packet network. In the example of FIG. 7, a transmitting device P10 includes a packet conversion unit P11, and a receiving device P20 includes a packet decoding unit P21, a clock reproduction unit P22, and a TDM signal restoration unit P23. The transmitting device P10 converts the TDM signal into packets, and transmits the packets to the receiving device P20 via the packet network PN. If the receiving device P20 receives the packets, the packet decoding unit P21 decodes the packets. In addition, the clock reproduction unit P22 generates a clock for restoring the TDM signal on the basis of the received packets (packets each including part of the TDM signal). The TDM signal restoration unit P23 restores the TDM signal on the basis of the clock generated by the clock reproduction unit P22.

DOCUMENTS OF THE PRIOR ART

Patent Documents

[Patent Document 1] Japanese Unexamined Patent Application, First Application No. 2001-168822

DISCLOSURE OF INVENTION

Problem to be Solved by the Invention

However, there is a problem in that the packet delay variation has an influence on the technology for implementing the restoration of the frequency component of the TDM signal using the packets including the TDM signal as described above. That is, as in the packet network, there is a problem in that the delay fluctuates in the transmission of unit data in a network (hereinafter referred to as a "unit data network") in which a series of data streams are divided into a plurality of unit data (for example, packets) and the plurality of unit data are transmitted. If the delay fluctuates as described above, the transmitting device and the receiving device need to reduce the effect of delay. Thus, a high-precision phase locked loop (PLL) is necessary for each TDM signal. For example, in the case of FIG. 7, the high-precision PLL for each TDM signal is necessary in the clock reproduction unit P22.

According to an aspect of the present invention in view of the above-described circumstances, an object of the invention is to provide technology for enabling TDM signals to be transmitted via a unit data network without a high-precision PLL for each TDM signal.

Means for Solving the Problem

According to an aspect of the present invention, there is provided a transmission system, having a transmitting device and a receiving device, which divides a series of data streams into a plurality of unit data and transmitting the plurality of unit data, wherein the transmitting device includes: a synchronization unit which outputs a clock signal synchronized with the receiving device by communicating synchronization unit data with the receiving device; a frequency change unit which changes a frequency of a time division multiplexing (TDM) signal on the basis of the clock signal output from the synchronization unit of its own device; and a conversion unit which converts the TDM signal with the changed frequency into the unit data and transmitting the unit data to the receiving device, and the receiving device includes: a synchronization unit which outputs a clock signal synchronized with the transmitting device by communicating synchronization unit data with the transmitting device; a decoding unit which receives the unit data from the transmitting device and generating the TDM signal with the changed frequency; and a frequency restoration unit which restores the TDM signal by returning a frequency of the TDM signal with the changed frequency to an original on the basis of the clock signal output from the synchronization unit of its own device.

According to an aspect of the present invention, there is provided a transmitting device which divides a series of data streams into a plurality of unit data and transmitting the plurality of unit data to a receiving device, including: a synchronization unit which outputs a clock signal synchronized with the receiving device by communicating synchronization unit data with the receiving device; a frequency change unit which changes a frequency of a TDM signal on the basis of the clock signal output from the synchronization unit; and a conversion unit which converts the TDM signal with the changed frequency into the unit data and transmitting the unit data to the receiving device.

According to an aspect of the present invention, there is provided a receiving device which receives a signal transmitted by dividing a series of data streams into a plurality of unit data, including: a synchronization unit which outputs a clock signal synchronized with a transmitting device by communicating synchronization unit data with the transmitting device, which includes a synchronization unit which outputs a clock signal, a frequency change unit which changes a frequency of a TDM signal on the basis of the clock signal output from the synchronization unit, and a conversion unit which converts the TDM signal with the changed frequency into the unit data and transmitting the unit data; a decoding unit which receives the unit data from the transmitting device and generating the TDM signal with the changed frequency; and a frequency restoration unit which restores the TDM signal by returning a frequency of the TDM signal with the changed frequency to an original on the basis of the clock signal output from the synchronization unit of its own device.

According to an aspect of the present invention, there is provided a transmission method, which is performed by a transmission system, having a transmitting device and a receiving device, which divides a series of data streams into a plurality of unit data and transmitting the plurality of unit data, including: outputting, by the transmitting device, a clock signal synchronized with the receiving device by communicating synchronization unit data with the receiving device; changing, by the transmitting device, a frequency of a TDM signal on the basis of the clock signal output by its own device; converting, by the transmitting device, the TDM signal with the changed frequency into the unit data and transmitting the unit data to the receiving device; outputting, by the receiving device, a clock signal synchronized with the transmitting device by communicating synchronization unit data with the transmitting device; receiving, by the receiving device, the unit data from the transmitting device and generating the TDM signal with the changed frequency; and restoring, by the receiving device, the TDM signal by returning a frequency of the TDM signal with the changed frequency to an original on the basis of the clock signal output by its own device.

According to an aspect of the present invention, there is provided a computer program for causing first and second computers to operate as a computer transmission system, having a transmitting device and a receiving device, which divides a series of data streams into a plurality of unit data and transmitting the plurality of unit data, wherein the computer program causes the first computer to execute: outputting a clock signal synchronized with the receiving device by communicating synchronization unit data with the receiving device; changing a frequency of a TDM signal on the basis of the clock signal output by its own device; and converting the TDM signal with the changed frequency into the unit data and transmitting the unit data to the receiving device, and the computer program causes the second computer to execute: outputting a clock signal synchronized with the transmitting device by communicating synchronization unit data with the transmitting device; receiving the unit data from the transmitting device and generating the TDM signal with the changed frequency; and restoring the TDM signal by returning a frequency of the TDM signal with the changed frequency to an original on the basis of the clock signal output by its own device.

Effect of the Invention

According to an aspect of the present invention, it is possible to transmit TDM signals via a unit data network without a high-precision PLL for each TDM signal.

EMBODIMENTS FOR CARRYING OUT THE INVENTION

First Embodiment

Figure 1:
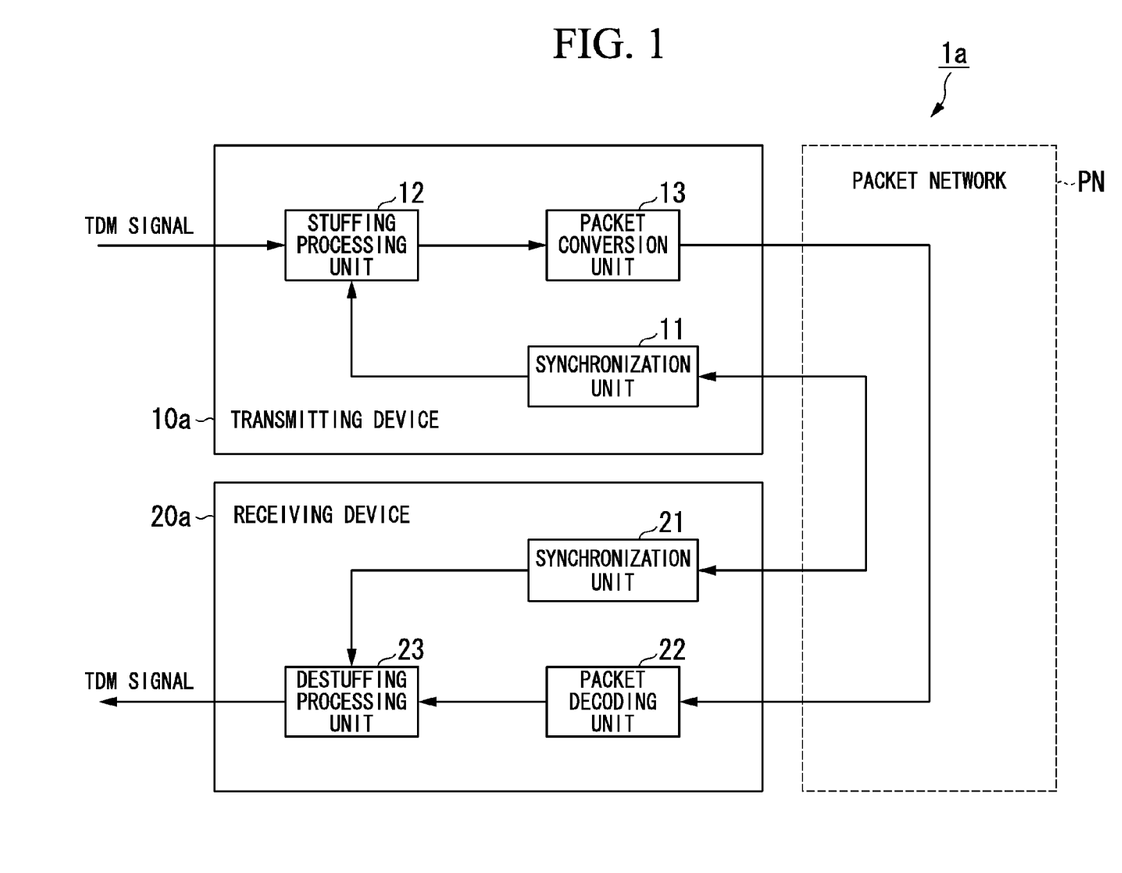
FIG. 1 is a system configuration diagram illustrating a system configuration of a transmission system according to a first embodiment.

FIG. 1 is a system configuration diagram illustrating a system configuration of a transmission system 1*a* according to the first embodiment. According to the first embodiment, the transmission system 1*a* includes a transmitting device 10*a* and a receiving device 20*a* in a system including a packet network PN. The packet network PN is a network for transmitting packets as unit data. In addition, the transmission system 1*a* is a system that divides a TDM signal including a series of data streams into a plurality of unit data (packets in this case) and transmits the unit data (packets). Hereinafter, the devices included in the transmission system 1*a* according to the first embodiment will be described.

The transmitting device 10*a* is installed in a boundary between a TDM transmission network for transmitting the TDM signal and the packet network PN. The transmitting device 10*a* receives the TDM signal from the TDM transmission network, and transmits the packets to the packet network PN. The transmission device 10*a* includes a central processing unit (CPU), a memory, and/or an auxiliary storage device connected by means of a bus, and functions as a device including a synchronization unit 11, a stuffing processing unit 12, and a packet conversion unit 13 by executing a communication program. All or some functions of the transmitting device 10*a* may be implemented using hardware such as an application specific integrated circuit (ASIC), a programmable logic device (PLD), and/or a field programmable gate array (FPGA). In addition, the transmitting device 10*a* may be implemented by causing a computer to read and execute the communication program recorded on a computer readable recording medium. The computer readable recording medium refers to a storage device including a flexible disk, a magneto-optical disc, a read only memory (ROM), a portable medium such as a compact disc-ROM (CD-ROM), and a hard disk embedded in a computer system.

The synchronization unit 11 communicates with a synchronization unit 21 of the receiving device 20*a* via the packet network PN, and acquires the synchronization of a frequency. For the synchronization, the synchronization units 11 and 21 communicate a synchronization packet (synchronization unit data) by means of a predetermined synchronization protocol or perform communication by causing a physical line itself to operate at a synchronized frequency. The predetermined synchronization protocol may be any protocol capable of implementing the synchronization. The synchronization unit 11 may perform communication, for example, by means of a protocol such as Institute of Electrical and Electronics Engineers (IEEE) 1588v2. In addition, the synchronization unit 11 may use, for example, the technology of International Telecommunications Union-Telecommunication Standardization Sector (ITU-T) G8261, synchronous Ethernet (registered trademark), or the like as a synchronization method using a physical line of the packet network PN. If the synchronization with the synchronization unit 21 is implemented, the synchronization unit 11 outputs a clock synchronized with the synchronization unit 21 to the stuffing processing unit 12.

The stuffing processing unit 12 receives a TDM signal transmitted to its own device (the transmitting device 10*a*), and performs a stuffing process for the received TDM signal. At this time, the stuffing processing unit 12 executes the stuffing process based on the clock output from the synchronization unit 11. The stuffing process is a process of inserting stuff (stuff data, stuff bits, stuff bytes, or the like) into a signal so as to compensate for an error between clocks of transmission and reception sides.

The stuffing processing unit 12 generates a TDM signal (hereinafter referred to as a "stuff-TDM signal") into which stuff has been inserted and of which a frequency has changed according to execution of the stuffing process. The stuffing processing unit 12 transmits the stuff-TDM signal to the packet conversion unit 13. As described above, the stuffing processing unit 12 has at least a function as a frequency change unit.

The packet conversion unit 13 converts the stuff-TDM signal into packets corresponding to the packet network PN, and transmits the packets to the receiving device 20a via the packet network PN. The packet conversion unit 13 performs the conversion, for example, on the basis of pseudo wire emulation edge to edge (PWE3). More specifically, the packet conversion unit 13 generates packets, for example, by dividing and encapsulating the stuff-TDM signal for each predetermined length. As described above, the packet conversion unit 13 has at least a function as a conversion unit.

The receiving device 20a is installed in a boundary between a TDM transmission network for transmitting the TDM signal and the packet network PN. The receiving device 20a receives the packets from the packet network PN, and transmits TDM signal to the TDM transmission network. The receiving device 20a includes a CPU, a memory, and/or an auxiliary storage device connected by means of a bus, and functions as a device including a synchronization unit 21, a packet decoding unit 22, and a destuffing processing unit 23 by executing a communication program. All or some functions of the receiving device 20a may be implemented using hardware such as an ASIC, a PLD, and/or an FPGA. In addition, the receiving device 20a may be implemented by causing a computer to read and execute the communication program recorded on a computer readable recording medium. The computer readable recording medium refers to a storage device including a flexible disk, a magneto-optical disc, a ROM, a portable medium such as a CD-ROM, and a hard disk embedded in a computer system.

The synchronization unit 21 outputs a clock synchronized with the synchronization unit 11 to the destuffing processing unit 23 according to the same operation as that of the synchronization unit 11.

The packet decoding unit 22 receives packets transmitted to its own device (the receiving device 20a) from the packet network PN, and performs a process of decoding the received packets. Specifically, the packet decoding unit 22 restores (generates) a stuff-TDM signal from the received packets, and outputs the restored (generated) signal to the destuffing processing unit 23. The packet decoding unit 22 performs the restoration, for example, on the basis of PWE3. As described above, the packet decoding unit 22 has at least a function as a decoding unit.

The destuffing processing unit 23 performs a destuffing process for the stuff-TDM signal. At this time, the destuffing processing unit 23 executes the destuffing process based on the clock output from the synchronization unit 21. The destuffing processing unit 23 restores (generates) a TDM signal returned to an original frequency from which stuff is extracted. The destuffing processing unit 23 transmits the TDM signal to the TDM transmission network. As described above, the destuffing processing unit 23 has at least a function as a frequency restoration unit.

Figure 2:
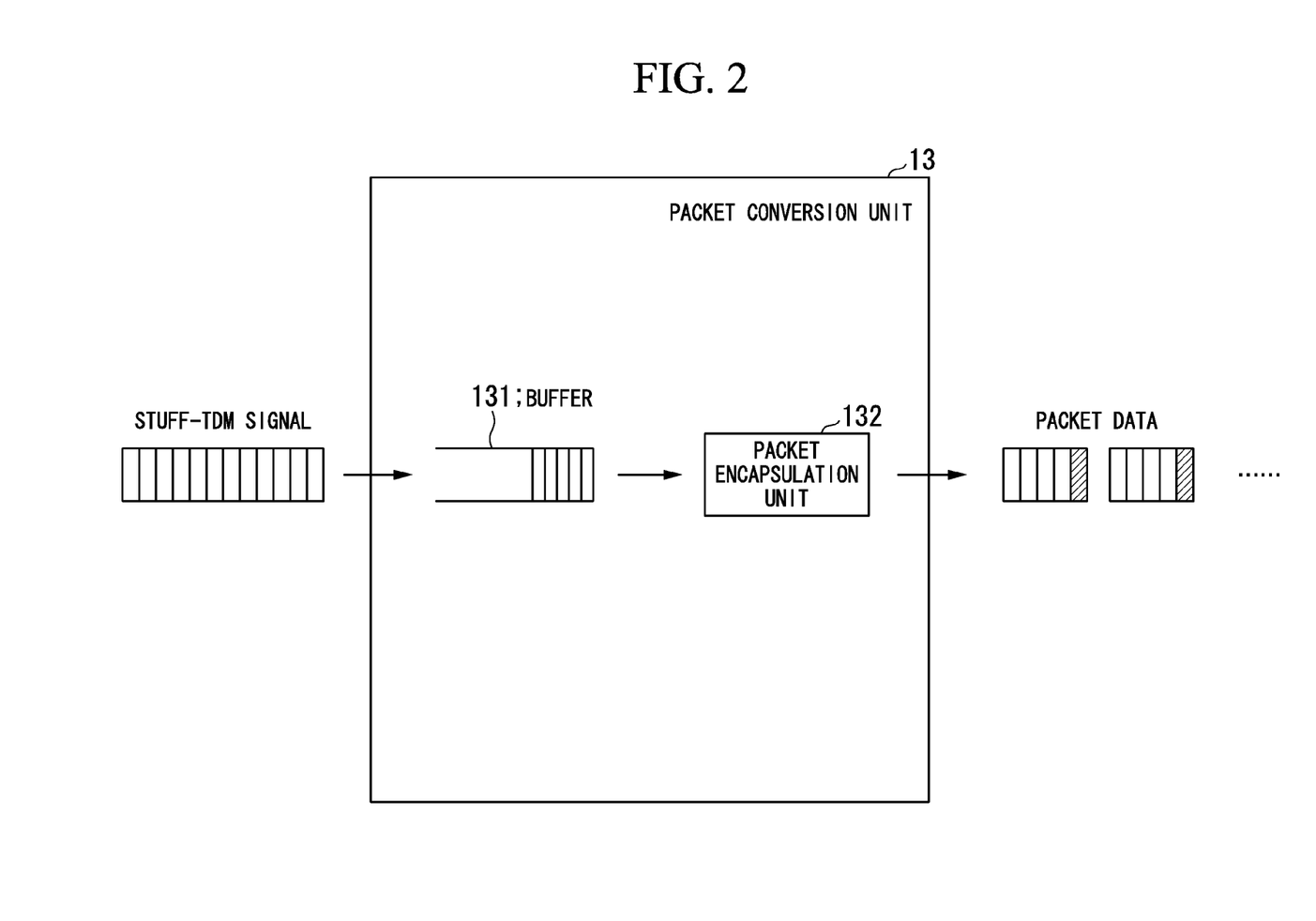
FIG. 2 is a diagram schematically illustrating a configuration of a packet conversion unit.

FIG. 2 is a diagram schematically illustrating a configuration of the packet conversion unit 13. The packet conversion unit 13 includes a buffer 131 and a packet encapsulation unit 132. The buffer 131 temporarily accumulates a stuff-TDM signal including a series of continuous data streams and reports an amount of the accumulated stuff-TDM signal to the packet encapsulation unit 132. If the stuff-TDM signal greater than or equal to a fixed amount is accumulated in the buffer 132, the packet encapsulation unit 132 reads a data stream having a predetermined length from the buffer 131. The packet encapsulation unit 132 generates packet data by designating the read data stream as a payload, assigning header information such as a destination IP address or a transmission source IP address, and performing encapsulation. The packet encapsulation unit 132 transmits the generated packet data to the packet network PN.

Figure 3:
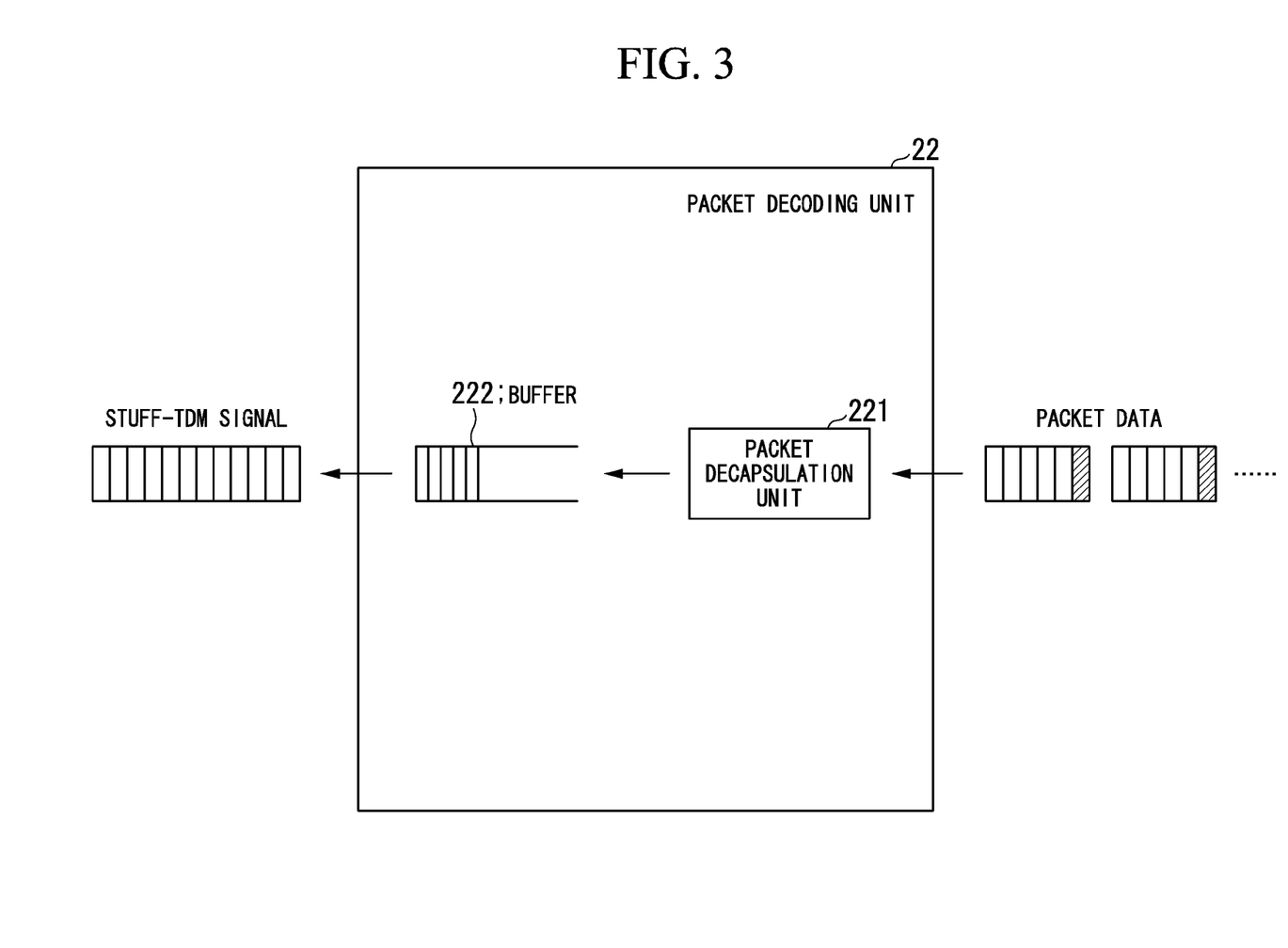
FIG. 3 is a diagram schematically illustrating a configuration of a packet decoding unit.

FIG. 3 is a diagram schematically illustrating a configuration of the packet decoding unit 22. The packet decoding unit 22 includes a packet decapsulation unit 221 and a buffer 222. The packet decapsulation unit 221 receives packet data from the packet network PN. The packet decapsulation unit 221 removes header information from the received packet data and reads a data stream placed in a payload portion. The packet decapsulation unit 221 writes the read data stream to the buffer 222. The buffer 222 temporarily accumulates the data stream written by the packet decapsulation unit 221 while maintaining its order. If a data stream greater than or equal to a fixed amount is accumulated, the buffer 222 outputs a stuff-TDM signal to the destuffing processing unit 23 as continuous data of which order is maintained.

Figure 4:
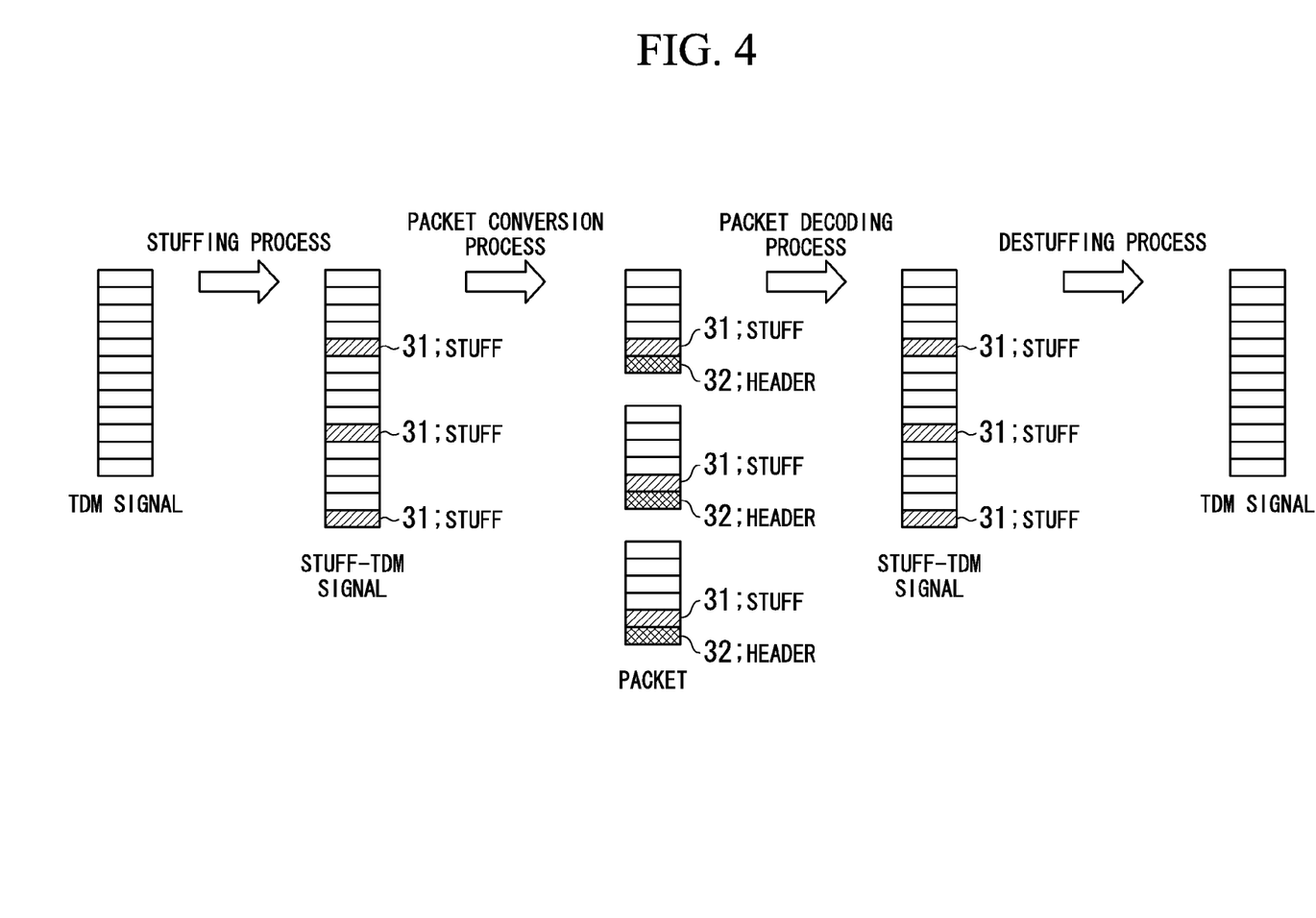
FIG. 4 is a diagram schematically illustrating the transition of a TDM signal in the transmission system.

FIG. 4 is a diagram schematically illustrating the transition of a TDM signal in the transmission system 1a. First, if the TDM signal is input to the transmitting device 10a, the stuffing processing unit 12 performs a stuffing process for the input TDM signal, thereby generating a stuff-TDM signal. Stuff 31 is periodically inserted into the stuff-TDM signal. Next, a packet conversion process is performed by the packet conversion unit 13, and a plurality of packets are generated from the stuff-TDM signal. Specifically, the stuff-TDM signal is divided into data streams, each of which has a predetermined length, and packets with headers 32 are generated. Each packet is transmitted to the receiving device 20a via the packet network PN.

If the receiving device 20a receives the packets, the packet decoding unit 22 performs a packet decoding process to restore a continuous stuff-TDM signal from the packets. The destuffing processing unit 23 performs a destuffing process to restore a TDM signal from which the stuff 31 has been removed.

Figure 5:
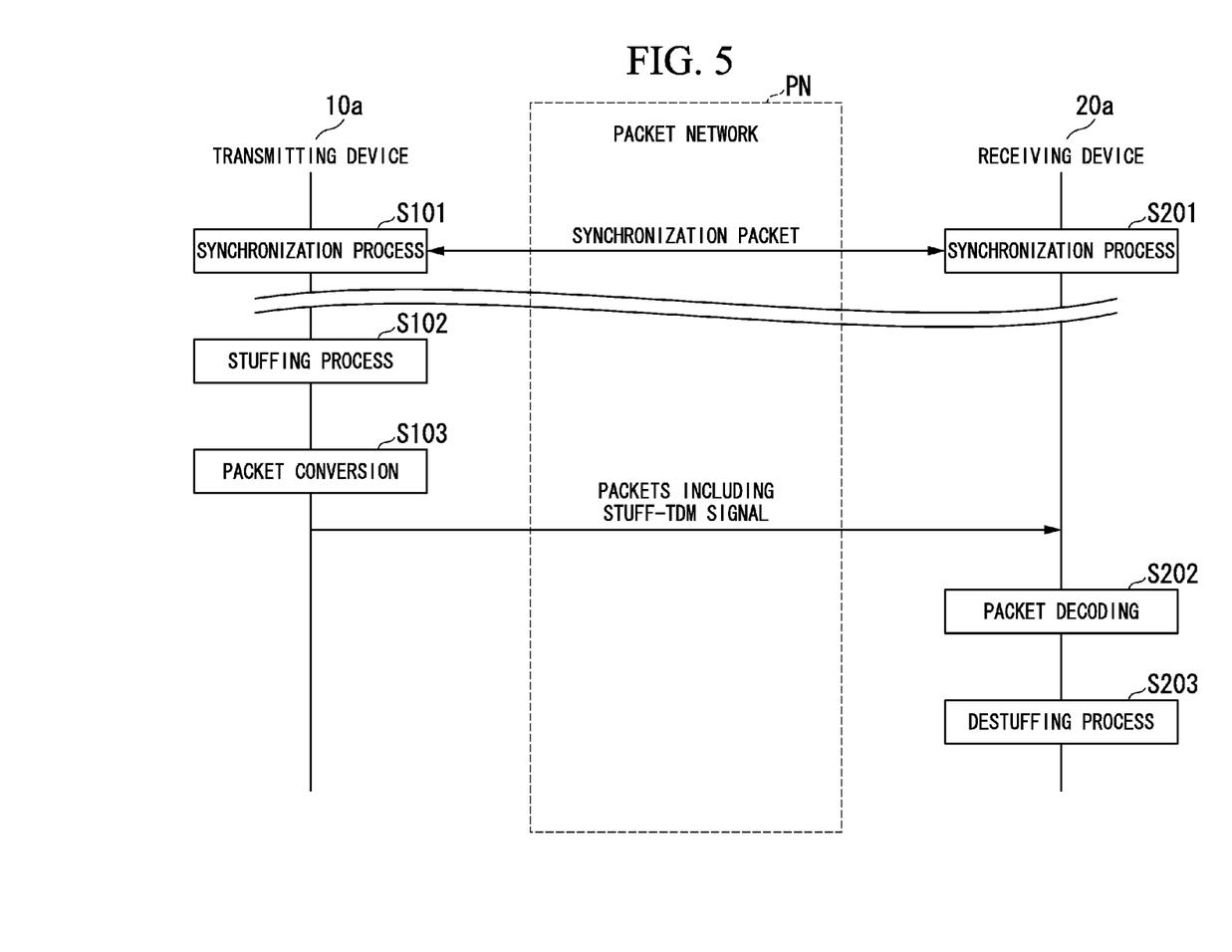
FIG. 5 is a sequence diagram illustrating a processing flow of the transmission system.

FIG. 5 is a sequence diagram illustrating a processing flow of the transmission system 1a. First, in the transmitting device 10a and the receiving device 20a that perform transmission and reception, the synchronization units 11 and 21 acquire synchronization by performing communication via the packet network PN (steps S101 and S201). After the synchronization has been acquired between the synchronization units 11 and 21, the stuffing processing unit 12 of the transmitting device 10a performs a stuffing process for a TDM signal on the basis of a clock from the synchronization unit 11, and generates a stuff-TDM signal (step S102). Next, the packet conversion unit 13 generates a plurality of packets by performing a packet conversion process for the stuff-TDM signal (step S103). The packet conversion unit 13 transmits the packets to the receiving device 20a via the packet network PN.

If the receiving device 20a receives the packets from the transmitting device 10a, the packet decoding unit 22 performs a packet decoding process, thereby restoring a stuff-TDM signal from the packets (step S202). Next, the destuffing processing unit 23 performs a destuffing process based on a clock output from the synchronization unit 21, thereby restoring a TDM signal (step S203). According to the above process, the TDM signal input to the transmitting device 10a is transmitted to the receiving device 20a via the packet network PN, so that the TDM signal is restored.

According to the transmission system 1a configured as described above, a TDM signal goes through the packet network PN according to the stuffing process and the destuffing process by the transmitting device 10a and the receiving device 20a. Thus, it is possible to restore a TDM signal of an original frequency component in the destination receiving device 20a via the packet network. In other words, the TDM signal synchronized between the transmission side and the reception side can be transmitted via the packet network.

In addition, it is preferable that one synchronization unit 21 be provided in the receiving device 20a, and it is not necessary to provide a high-precision PLL for each time-division signal multiplexed signal.

Modified Example

Although an example of an Internet protocol (IP) packet has been described above as unit data (a protocol data unit (PDU)) to be transmitted over the packet network PN, the unit data to be transmitted over the packet network PN need not be limited to the IP packet as described above. Any PDU such as a frame or a cell may be transmitted. For example, an Ethernet (registered trademark) frame header, a transmission control protocol (TCP) frame, a user datagram protocol (UDP) frame, a multi-protocol label switching (MPLS) packet, and the like may be provided. In this case, the packet conversion unit 13 and the packet decoding unit 22 are each designated appropriately according to a PDU to be transmitted.

In addition, in the processing flow of FIG. 5, it is preferable that the synchronization unit 11 and the synchronization unit 21 execute the synchronization processes (steps S101 and S201) at least once to acquire the synchronization before the stuffing process (step S102) and the destuffing process (step S202) subsequent thereto. The synchronization processes need not be performed immediately before the stuffing process and the destuffing process every time the stuffing process and the destuffing process are performed. For example, the synchronization processes by the synchronization units 11 and 21 may be executed in parallel with the stuffing process and the destuffing process in cycles, or at timings different from those of the stuffing process and the destuffing process.

In addition, the configuration of the packet conversion unit 13 illustrated in FIG. 2 is only an example, and the packet conversion unit 13 may be implemented with a configuration different from FIG. 2. For example, the buffer 131 may be configured not to notify the packet encapsulation unit 132 of an amount of an accumulated stuff-TDM signal. In this case, for example, the packet encapsulation unit 132 may be configured to read a data stream from the buffer 131 in a fixed cycle.

In addition, the configuration of the packet decoding unit 22 illustrated in FIG. 3 is only an example, and the packet decoding unit 22 may be implemented with a configuration different from FIG. 3. For example, the packet decoding unit 22 may be configured without the buffer 222. In this case, the packet decapsulation unit 221 may transmit a stuff-TDM signal to the destuffing processing unit 23 in a discontinuous type.

Second Embodiment

Figure 6:
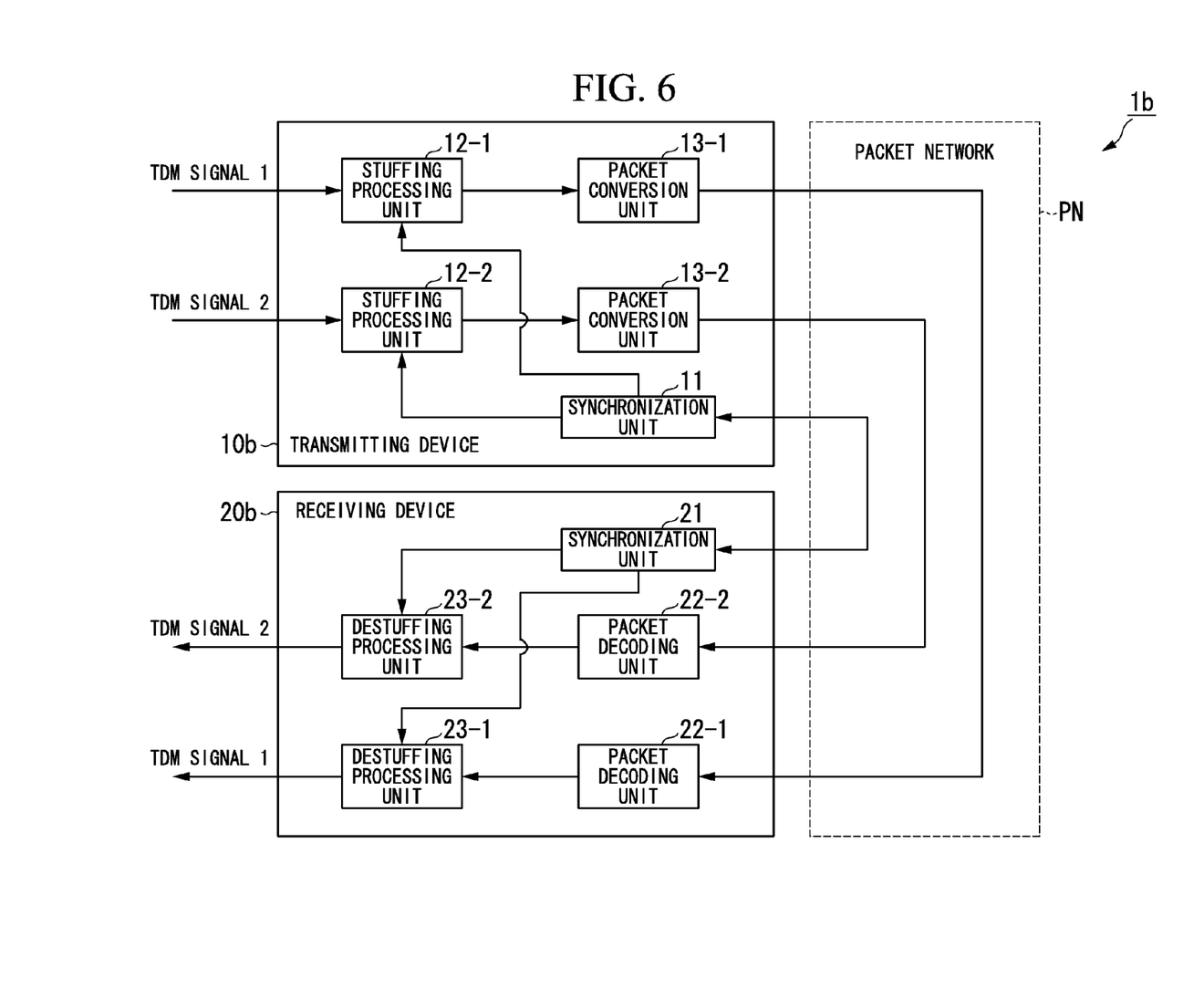
FIG. 6 is a system configuration diagram illustrating a system configuration of a transmission system according to a second embodiment.

FIG. 6 is a system configuration diagram illustrating a system configuration of a transmission system 1b according to the second embodiment. According to the second embodiment, the transmission system 1b includes a transmitting device 10b and a receiving device 20b in a system including a packet network PN. The packet network PN is a network for transmitting packets as unit data. In addition, the transmission system 1b is a system that divides a TDM signal including a series of data streams into a plurality of unit data (packets in this case) and transmits the unit data (packets). Hereinafter, the devices included in the transmission system 1b according to the second embodiment will be described.

The transmitting device 10b is installed in a boundary between a TDM transmission network for transmitting TDM signals and the packet network PN. The transmitting device 10b receives a plurality of TDM signals (TDM signals 1 and 2) from the TDM transmission network, and transmits packets each including a TDM signal to the packet network PN. The transmission device 10b includes a CPU, a memory, and/or an auxiliary storage device connected by means of a bus, and functions as a device including a synchronization unit 11, a plurality of stuffing processing units 12 (12-1 and 12-2), and a plurality of packet conversion units 13 (13-1 and 13-2) by executing a communication program. All or some functions of the transmitting device 10b may be implemented using hardware such as an ASIC, a PLD, and/or an FPGA. In addition, the transmitting device 10b may be implemented by causing a computer to read and execute the communication program recorded on a computer readable recording medium. The computer readable recording medium refers to a storage device including a flexible disk, a magneto-optical disc, a ROM, a portable medium such as a CD-ROM, and a hard disk embedded in the computer system. In addition, although the transmitting device 10b illustrated in FIG. 6 includes the two stuffing processing units 12, the number of stuffing processing units 12 provided in the transmitting device 10b may be greater than or equal to 3. In addition, although the transmitting device 10b illustrated in FIG. 6 includes the two packet conversion units 13, the number of packet conversion units 13 provided in the transmitting device 10b may be greater than or equal to 3.

The synchronization unit 11 according to the second embodiment is different from the synchronization unit 11 according to the first embodiment in that a clock is output to the plurality of stuffing processing units 12 (12-1 and 12-2), and the remaining configuration is the same as the synchronization unit 11 according to the first embodiment.

Configurations of the stuffing processing units 12-1 and 12-2 according to the second embodiment are each the same as the stuffing processing unit 12 according to the first embodiment. However, targets to be processed by the stuffing processing units 12-1 and 12-2 are different TDM signals (the TDM signals 1 and 2). In the TDM signals 1 and 2, a cycle in which signals are multiplexed is different.

Configurations of the packet conversion units 13-1 and 13-2 according to the second embodiment are each the same as the packet conversion unit 13 according to the first embodiment. However, targets to be processed by the packet conversion units 13-1 and 13-2 are different stuff-TDM signals. Specifically, the packet conversion unit 13-1 generates packets from the stuff-TDM signal in which stuff has been inserted into the TDM signal 1 (that is, the stuff-TDM signal generated by the stuffing processing unit 12-1). In addition, the packet conversion unit 13-2 generates packets from the stuff-TDM signal in which stuff has been inserted into the TDM signal 2 (that is, the stuff-TDM signal generated by the stuffing processing unit 12-2).

The receiving device 20b is installed in a boundary between a TDM transmission network for transmitting TDM signals and the packet network PN. The receiving device 20*a* receives packets from the packet network PN and transmits TDM signals (the TDM signals 1 and 2) to the TDM transmission network. The receiving device 20*b* includes a CPU, a memory, and/or an auxiliary storage device connected by means of a bus, and functions as a device including a synchronization unit 21, a plurality of packet decoding units 22 (22-1 and 22-2), and a plurality of destuffing processing units 23 (23-1 and 23-2) by executing a communication program. All or some functions of the receiving device 20*b* may be implemented using hardware such as an ASIC, a PLD, and/or an FPGA. In addition, the receiving device 20*b* may be implemented by causing a computer to read and execute the communication program recorded on a computer readable recording medium. The computer readable recording medium refers to a storage device including a flexible disk, a magneto-optical disc, a ROM, a portable medium such as a CD-ROM, and a hard disk embedded in a computer system. In addition, although the receiving device 20*b* illustrated in FIG. 6 includes the two destuffing processing units 23, the number of destuffing processing units 23 provided in the receiving device 20*b* may be greater than or equal to 3. In addition, although the receiving device 20*b* illustrated in FIG. 6 includes the two packet decoding units 22, the number of packet decoding units 22 provided in the receiving device 20*b* may be greater than or equal to 3.

The synchronization unit 21 according to the second embodiment is different from the synchronization unit 21 according to the first embodiment in that a clock is output to the plurality of destuffing processing units 23 (23-1 and 23-2), and the remaining configuration is the same as the synchronization unit 21 according to the first embodiment.

Configurations of the packet decoding units 22-1 and 22-2 according to the second embodiment are each the same as those of the packet decoding unit 22 according to the first embodiment. However, the packet decoding units 22-1 and 22-2 each restore different stuff-TDM signals. Specifically, the packet decoding unit 22-1 restores a stuff-TDM signal in which stuff has been inserted into the TDM signal 1 on the basis of packets transmitted from the packet conversion unit 13-1. In addition, the packet decoding unit 22-2 restores a stuff-TDM signal in which stuff has been inserted into the TDM signal 2 on the basis of packets transmitted from the packet conversion unit 13-2.

Configurations of the destuffing processing units 23-1 and 23-2 are each the same as those of the destuffing processing unit 23 according to the first embodiment. However, the destuffing processing units 23-1 and 23-2 restore different TDM signals (the TDM signals 1 and 2). That is, the destuffing processing unit 23-1 restores the TDM signal 1 using the stuff-TDM signal restored by the packet decoding unit 22-1, and the destuffing processing unit 23-2 restores the TDM signal 2 using the stuff-TDM signal restored by the packet decoding unit 22-2.

According to the transmission system 1*b* configured as described above, synchronization can be acquired by a set of the synchronization units 11 and 21 common to TDM signals when a plurality of different TDM signals with different frequencies are transmitted via the packet network PN. That is, it is possible to implement the transmission of a plurality of TDM signals with different frequencies by the synchronization units 11 and 21 of one set. Thus, sets of synchronization units 11 and 21 need not be provided in the same number as the number of TDM signals. In addition, PLLs need not be provided in the same number as the number of TDM signals.

Although the embodiments of the present invention have been described above with reference to the drawings, specific configurations are not limited to these embodiments, and designs can also be made without departing from the scope of the present invention.

Priority is claimed on Japanese Patent Application No. 2009-287806, filed Dec. 18, 2009, the contents of which are incorporated herein by reference.

INDUSTRIAL APPLICABILITY

According to an aspect of the present invention, it is possible to transmit TDM signals via a unit data network without a high-precision PLL for each TDM signal.

REFERENCE SYMBOLS

1*a*, 1*b* . . . Transmission system
10*a*, 10*b* . . . Transmitting device
20*a*, 20*b* . . . Receiving device
11 . . . Synchronization unit
12 . . . Stuffing processing unit (frequency change unit)
13 . . . Packet conversion unit (conversion unit)
21 . . . Synchronization unit
22 . . . Packet decoding unit (decoding unit)
23 . . . Destuffing processing unit (frequency restoration unit)
131 . . . Buffer
132 . . . Packet encapsulation unit
221 . . . Packet decapsulation unit
222 . . . Buffer
31 . . . Stuff
32 . . . HeaderCLAIMS

The invention claimed is:

1. A transmission system, having a transmitting device and a receiving device, which divides a series of data streams into a plurality of unit data and transmitting the plurality of unit data,
wherein the transmitting device includes:
a synchronization unit which outputs a clock signal synchronized with the receiving device by communicating synchronization unit data with the receiving device;
a frequency change unit which changes a frequency of a time division multiplexing (TDM) signal on the basis of the clock signal output from the synchronization unit of its own device; and
a conversion unit which converts the TDM signal with the changed frequency into the plurality of unit data and transmitting the plurality of unit data to the receiving device, and
the receiving device includes:
a synchronization unit which outputs a clock signal synchronized with the transmitting device by communicating synchronization unit data with the transmitting device;
a decoding unit which receives the plurality of unit data from the transmitting device and generating the TDM signal with the changed frequency; and
a frequency restoration unit which restores the TDM signal by returning a frequency of the TDM signal with the changed frequency to an original on the basis of the clock signal output from the synchronization unit of its own device.

2. The transmission system according to claim 1, wherein:
the transmitting device includes sets of frequency change units and conversion units for each plurality of signals with different frequencies and each frequency change unit makes a frequency change based on a clock signal output from the synchronization unit, and the receiving device includes sets of decoding units and frequency restoration units in the same number as that of the sets of the frequency change units and the conversion units of the transmitting device, and each frequency restoration unit performs the restoration of the TDM signal based on a clock signal output from the synchronization unit.

3. A transmitting device which divides a series of data streams into a plurality of unit data and transmitting the plurality of unit data to a receiving device, comprising:
   a synchronization unit which outputs a clock signal synchronized with the receiving device by communicating synchronization unit data with the receiving device;
   a frequency change unit which changes a frequency of a TDM signal on the basis of the clock signal output from the synchronization unit; and
   a conversion unit which converts the TDM signal with the changed frequency into the plurality of unit data and transmitting the plurality of unit data to the receiving device.

4. A receiving device which receives a signal transmitted by dividing a series of data streams into a plurality of unit data, comprising:
   a synchronization unit which outputs a clock signal synchronized with a transmitting device by communicating synchronization unit data with the transmitting device, which includes a synchronization unit which outputs a clock signal, a frequency change unit which changes a frequency of a TDM signal on the basis of the clock signal output from the synchronization unit, and a conversion unit which converts the TDM signal with the changed frequency into the plurality of unit data and transmitting the plurality of unit data;
   a decoding unit which receives the plurality of unit data from the transmitting device and generating the TDM signal with the changed frequency; and
   a frequency restoration unit which restores the TDM signal by returning a frequency of the TDM signal with the changed frequency to an original on the basis of the clock signal output from the synchronization unit of its own device.

5. A transmission method, which is performed by a transmission system, having a transmitting device and a receiving device, which divides a series of data streams into a plurality of unit data and transmitting the plurality of unit data, comprising:
   outputting, by the transmitting device, a clock signal synchronized with the receiving device by communicating synchronization unit data with the receiving device;
   changing, by the transmitting device, a frequency of a TDM signal on the basis of the clock signal output by its own device;
   converting, by the transmitting device, the TDM signal with the changed frequency into the plurality of unit data and transmitting the plurality of unit data to the receiving device;
   outputting, by the receiving device, a clock signal synchronized with the transmitting device by communicating synchronization unit data with the transmitting device;
   receiving, by the receiving device, the plurality of unit data from the transmitting device and generating the TDM signal with the changed frequency; and
   restoring, by the receiving device, the TDM signal by returning a frequency of the TDM signal with the changed frequency to an original on the basis of the clock signal output by its own device.

6. A computer-readable, non-transitory, recording medium in which a computer program is recorded, the computer program causes first and second computers to operate as a computer transmission system, having a transmitting device and a receiving device, which divides a series of data streams into a plurality of unit data and transmitting the plurality of unit data,
   wherein the computer program causes the first computer to execute:
   outputting a clock signal synchronized with the receiving device by communicating synchronization unit data with the receiving device;
   changing a frequency of a TDM signal on the basis of the clock signal output by its own device; and
   converting the TDM signal with the changed frequency into the plurality of unit data and transmitting the plurality of unit data to the receiving device, and
   the computer program causes the second computer to execute:
   outputting a clock signal synchronized with the transmitting device by communicating synchronization unit data with the transmitting device;
   receiving the plurality of unit data from the transmitting device and generating the TDM signal with the changed frequency; and
   restoring the TDM signal by returning a frequency of the TDM signal with the changed frequency to an original on the basis of the clock signal output by its own device.

* * * * *